UNITED STATES PATENT OFFICE.

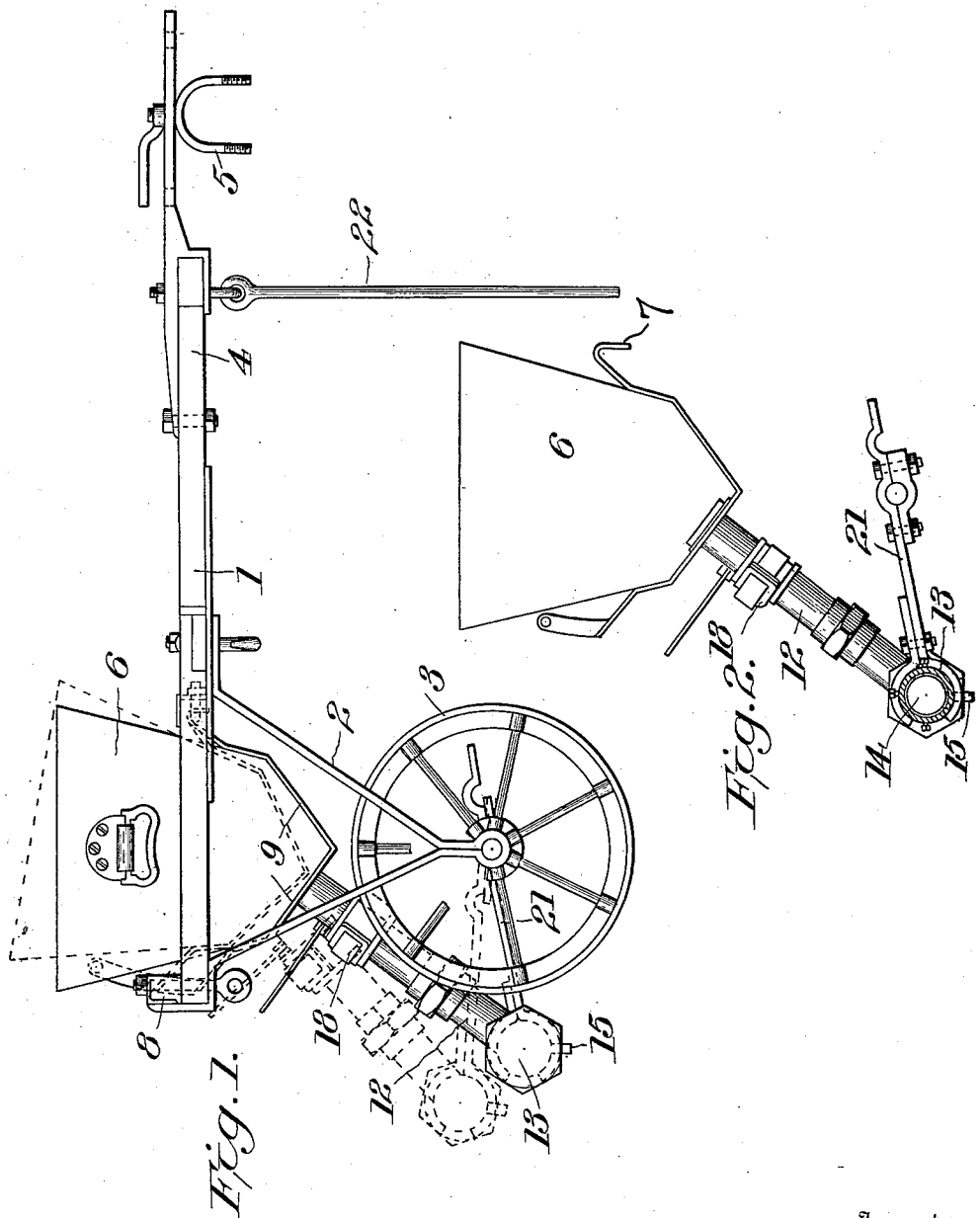

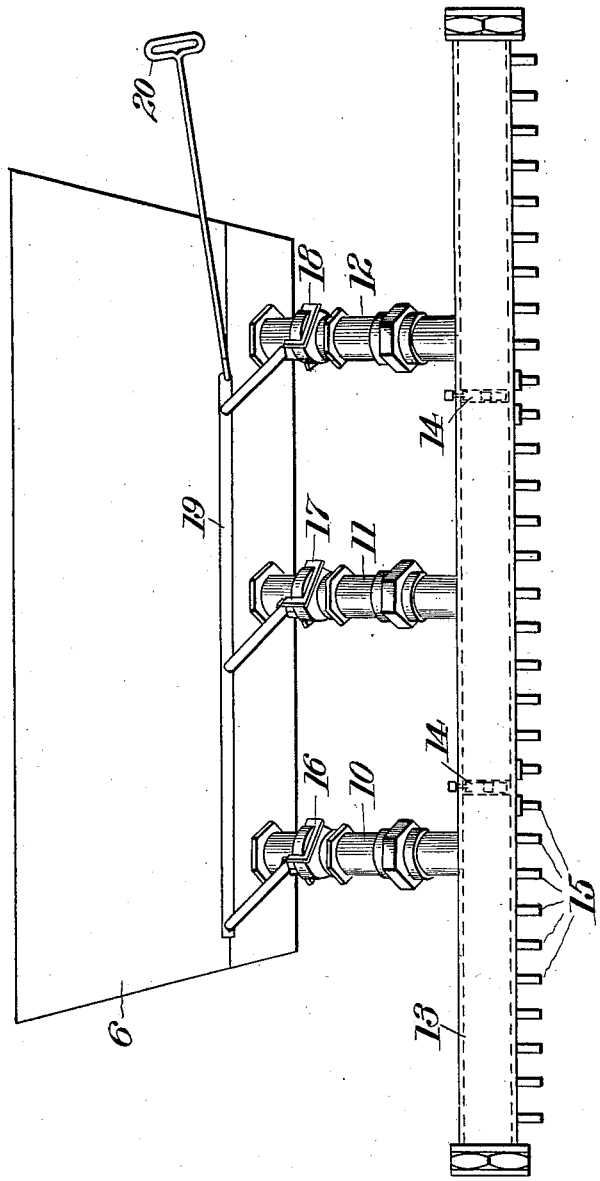

CHARLES P. PRICE, OF MALDEN, MASSACHUSETTS, ASSIGNOR, BY MESNE ASSIGNMENTS, TO BITUMINOUS ROAD IMPLEMENT COMPANY, A CORPORATION OF MASSACHUSETTS.

FLUID-DISTRIBUTING MACHINE.

1,083,030.  Specification of Letters Patent.  Patented Dec. 30, 1913.

Application filed February 23, 1910. Serial No. 545,396.

*To all whom it may concern:*

Be it known that I, CHARLES P. PRICE, a citizen of the United States, residing at Malden, in the county of Middlesex, State of Massachusetts, have invented certain new and useful Improvements in Fluid-Distributing Machines, of which the following is a description, reference being had to the accompanying drawing and to the figures of reference marked thereon.

My invention relates to new and useful improvements in machines for applying heavy bituminous materials in road construction, and has for an object to provide a distributer wherein the distributing pipe and the delivering pipes therefor, and also the valves for controlling the delivery pipes are so located and arranged as to prevent the clogging of the apparatus by the cooling of the products being distributed.

A further object of the invention is to provide an apparatus for distributing heavy bituminous materials which shall be simple in construction and efficient and durable in operation.

These and other objects will in part be obvious, and will in part be hereinafter more fully described.

In the drawings which show by way of illustration one embodiment of the invention, Figure 1 is a side view showing my improved distributing machine. Fig. 2 is a side view of the tank and distributing pipes attached thereto; Fig. 3 is a back view of the same.

I have provided an apparatus or machine which is adapted to be used in connection with a main auxiliary supply tank by attachment to the rear axle of the tank wagon. My machine consists of a framework 1, carrying depending brackets 2, in which are journaled wheels 3, for supporting the machine. The frame 1 has a forwardly projecting tongue 4 which may be secured to the rear axle of the main tank wagon, by a clip 5 of any desired construction.

In the frame 1 is a tank 6, which is so located relatively to the main tank wagon that the delivery pipe from the main tank wagon, is directly over the auxiliary tank, so that said auxiliary tank may be supplied with the products which it is desired to distribute upon the road bed. As herein shown, the tank 6 is provided with a hook 7, at its forward end, which engages a suitable bracket on the frame 1, so that said tank may swing about said hook connections as a hinge or pivot, and the tank be angularly adjusted relatively to the frame 1.

Any suitable supporting bracket 8 may be provided at the rear of the frame for engaging the tank and sustaining the same in adjusted positions. The tank 6 is provided with a bottom having inclined portions 9, 9. Delivery pipes 10, 11, and 12 are rigidly secured to the inclined portion 9 of the tank. A distributing pipe 13 is supported at the lower ends of the pipes 10, 11 and 12. The pipes 10, 11 and 12 are threaded into the upper face of the distributing pipe 13. The distributing pipe is closed at each end by any suitable means and may be divided into sections by partitions 14, 14 as shown in dotted lines in Fig. 3.

The distributing pipe 13 at its lower face is provided with a plurality of discharge openings which as herein shown, are fitted with nozzles 15, although it is obvious that the nozzles may be omitted and the material distributed directly through openings in the lower face of the pipe. The pipe 10 is provided with a valve 16 which is located at a point adjacent the tank 6 so that the supply may be shut off at a point close to the tank. The delivery pipes 11 and 12 are also provided with similar valves 17 and 18 respectively, which are each located adjacent the tank. Each valve carries a suitable handle. Said handles may if desired be reciprocated by a hand rod 20 so that all of the valves may be simultaneously closed or opened.

I have found in practice that when it is desired to distribute upon the road bed heavy bituminous material or the like, it is necessary to provide an apparatus wherein the supply may be cut off at a point close to the auxiliary tank, otherwise the cooling of the bituminous products will clog the delivering pipes and the distributing pipes. By my arrangement where the valves are located close to the tank, the supply may be cut off so that there will be no cooling of the bituminous products in the delivering pipe or distributing pipe, which would tend to clog the same. It will also be noted that by my construction where only three delivering pipes are used, said pipes may be made sufficiently large so as to convey the heavy material without clogging. Then again, by my construction wherein the delivery pipes are straight and extend directly from the tank to the upper face of the distributing pipe, I provide a delivery passage which leads directly from the tank into the distributing pipe and thus avoids the use of elbows or bent portions which would tend to restrict the free passage of the heavy materials. Furthermore, by my construction, the distributing pipe is supported solely by the delivering pipes, thus producing a very rigid and much simplified construction which is not only durable in use, but which can be cheaply made. The partitions 14 in the distributing pipe, form said pipe into sections which will aid in the proper distribution of the bituminous products even though the road bed be rolling and one side of the machine located in a much lower position than the other.

It is sometimes desirable to adjust the position of the distributing pipe relative to the road bed, and this can be readily accomplished by adjusting the tank 6 in its supporting frame. As an auxiliary means for steadying the distributing pipe and its connection with the tank, I have provided a link 21 which is adapted to engage the axle of the machine and hold said tank rigidly in a definite position relative to said axle. In Fig. 2, it will be readily seen that said link 21 is provided with means whereby the same may be adjustably connected with the axle. I have also found in practice that the distributing pipe may be shifted relatively to the road bed by placing the tongue 4 either under or over the axle of the main distributing wagon, and reversing the clip 5 so as to properly connect the same to the axle. A supporting rod 22 may be used in connection with the tongue 4, in order to hold the tongue in an upright position when the device is detached from the main wagon. The heavy bituminous products of course, are heated and delivered to the auxiliary tank in heated condition, so that they may be properly distributed to the road bed. By having the valves close to the tank, said valves are sufficiently close to the heated mass in the tank 6 as to be properly operated and all the parts of the distributing apparatus which are located at any distance from the heated mass are cut off from the supply by closing the valves, which as above noted, prevents the clogging of the apparatus by the cold heavy bituminous products.

Having thus particularly described my invention, what I claim as new and desire to secure by Letters Patent, is:—

1. A distributing machine adapted to be attached to a tank wagon, including a supporting frame, brackets secured to said frame, wheels journaled on said brackets, a tank mounted in said frame, a distributing pipe having openings formed in its lower face, short straight delivering pipes rigidly connected to the bottom of said tank and rigidly connected to the upper face of said distributing pipe, a valve for each delivering pipe located at a point adjacent the auxiliary tank, and means for adjusting said auxiliary tank in said frame whereby the position of the distributing pipe relative to the road bed, may be varied.

2. A distributing machine adapted to be attached to a tank wagon, including a supporting frame, brackets secured to said frame, wheels journaled on said brackets, a distributing pipe having openings formed in its lower face, short straight pipes rigidly connected to the bottom of the tank and rigidly connected to the upper face of said distributing pipe, a valve for each short pipe located at a point adjacent the tank, a link connected to the distributing pipe and having means for adjustable connection with the frame of the machine, whereby said tank may be swung in the frame and the position of the distributing pipe relative to the road bed varied.

In testimony whereof I affix my signature, in presence of two witnesses.

CHARLES P. PRICE.

Witnesses:
E. H. PARKINS,
E. G. MASON.

Copies of this patent may be obtained for five cents each, by addressing the "Commissioner of Patents, Washington, D. C."